United States Patent
Sharp et al.

(10) Patent No.: US 8,967,417 B2
(45) Date of Patent: Mar. 3, 2015

(54) ANTI-EXTRUSION SEALING SYSTEM FOR THE OUTLET OF A PLASTIC-LINED COMPRESSED GAS CYLINDER

(75) Inventors: Jeffrey J. Sharp, Cochrane (CA); Mark Duncan, Calgary (CA)

(73) Assignee: Luxfer Canada Limited, Calgary (CA)

( * ) Notice: Subject to any disclaimer, the term of this patent is extended or adjusted under 35 U.S.C. 154(b) by 0 days.

(21) Appl. No.: 13/037,277

(22) Filed: Feb. 28, 2011

(65) Prior Publication Data

US 2011/0210516 A1  Sep. 1, 2011

Related U.S. Application Data

(60) Provisional application No. 61/308,736, filed on Feb. 26, 2010, provisional application No. 61/308,751, filed on Feb. 26, 2010.

(51) Int. Cl.
*F17C 1/00* (2006.01)
*F17C 1/16* (2006.01)

(52) U.S. Cl.
CPC ........... *F17C 1/16* (2013.01); *F17C 2201/0109* (2013.01); *F17C 2201/018* (2013.01); *F17C 2203/0604* (2013.01); *F17C 2203/0619* (2013.01); *F17C 2203/0621* (2013.01); *F17C 2203/066* (2013.01); *F17C 2203/0663* (2013.01); *F17C 2205/0305* (2013.01); *F17C 2205/0323* (2013.01); *F17C 2209/227* (2013.01); *F17C 2209/234* (2013.01); *F17C 2221/012* (2013.01);
(Continued)

(58) Field of Classification Search
USPC ............................ 277/603, 622; 220/581, 582
See application file for complete search history.

(56) References Cited

U.S. PATENT DOCUMENTS 3,150,889 A * 9/1964 Watts .......................... 285/332.2
3,258,279 A * 6/1966 Johnsen ........................ 285/110
(Continued)

FOREIGN PATENT DOCUMENTS

| CN | 101832389 A | 9/2010 |
| WO | 00/49330 A1 | 8/2000 |

OTHER PUBLICATIONS

PCT Search Report issued in respect of corresponding PCT Application No. PCT/CA2011/050119.
(Continued)

*Primary Examiner* — Kristina Fulton
*Assistant Examiner* — Eugene G Byrd
(74) *Attorney, Agent, or Firm* — Sean W Goodwin

(57) ABSTRACT

A sealing system for an outlet of a plastic-lined cylinder has a plastic liner outlet extending into a bore of a boss. An insert is engageable with the bore, forming a primary seal between the insert and portion of the liner outlet. Further, a tapered compression surface of the insert engages a tapered bore portion of the liner outlet adjacent the primary seal for compressing the liner outlet and closing any annular assembly clearance at the primary seal for obviating opportunity for seal extrusion under pressure. An axial position in the boss, and dimensional integrity, of the liner outlet is maintained by engaging an annular distal end of the liner outlet in the bore by a stop. The stop can be integral with the boss. Reverse extrusion of the primary seal due to trapped gas and rapid decompression of the cylinder can be defeated by providing a leak path.

14 Claims, 17 Drawing Sheets

(52) U.S. Cl.
CPC ..... *F17C 2221/017* (2013.01); *F17C 2221/033* (2013.01); *F17C 2223/0123* (2013.01); *F17C 2223/036* (2013.01); *F17C 2260/036* (2013.01); *Y02E 60/321* (2013.01)
USPC ...... 220/581; 220/582; 220/526; 220/203.25; 220/240; 277/603

(56) References Cited

U.S. PATENT DOCUMENTS

| | | | |
|---|---|---|---|
| 5,429,845 A | | 7/1995 | Newhouse et al. |
| 5,494,188 A | | 2/1996 | Sirosh |
| 5,819,978 A | * | 10/1998 | Hlebovy ........................ 220/601 |
| 5,938,209 A | * | 8/1999 | Sirosh et al. ................. 277/622 |
| 6,186,356 B1 | * | 2/2001 | Berkley et al. ................ 220/582 |
| 6,227,402 B1 | * | 5/2001 | Shimojima et al. ........... 220/581 |
| 7,032,767 B2 | * | 4/2006 | Funck .......................... 220/581 |
| 7,556,171 B2 | * | 7/2009 | Ishimaru ....................... 220/586 |
| 7,731,051 B2 | * | 6/2010 | Rohwer et al. ................ 220/586 |
| 7,857,159 B2 | * | 12/2010 | Lindner ........................ 220/586 |
| 7,861,887 B2 | * | 1/2011 | Ota et al. ....................... 220/581 |
| 7,971,852 B2 | * | 7/2011 | Otsubo et al. ................. 251/144 |
| 8,186,536 B2 | * | 5/2012 | Strack ........................... 220/586 |
| 8,231,028 B2 | * | 7/2012 | Matsuoka et al. ............. 220/582 |
| 2008/0251520 A1 | | 10/2008 | Ota et al. |
| 2009/0255940 A1 | * | 10/2009 | Murate et al. ................. 220/592 |

OTHER PUBLICATIONS

Extract of 2007 handbook by Parker Hannafin Corporation obtained from http://www.parker.com/literature/ORD%205700%20Parker_ O-Ring_Handbook.pdf, generated on Nov. 18, 2013, 98 of 292 pages.
"O-ring, Seal Failure Analysis" by Problem Solving Products, Inc., obtained from www.pspglobal.com/abrasion.html.
Paper titled "International Hydrogen Fuel and Pressure Vessel Forum 2010", Beijing, China, Sep. 27-29, 2010, 15 pages.

\* cited by examiner

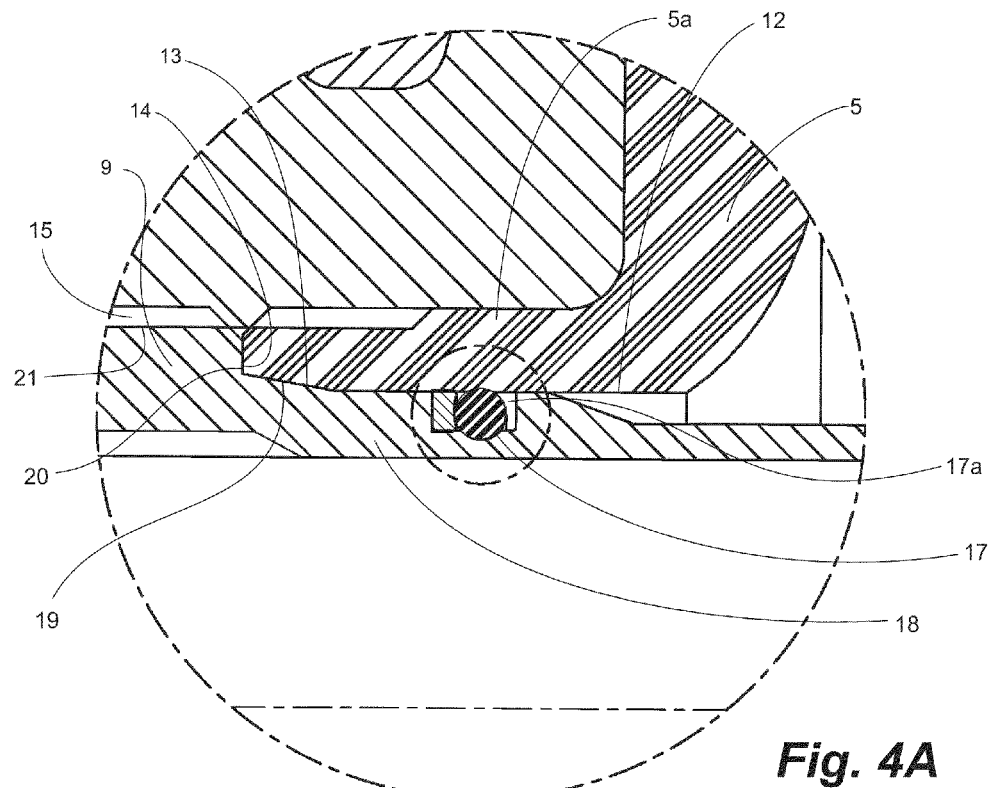
*Fig. 4A*
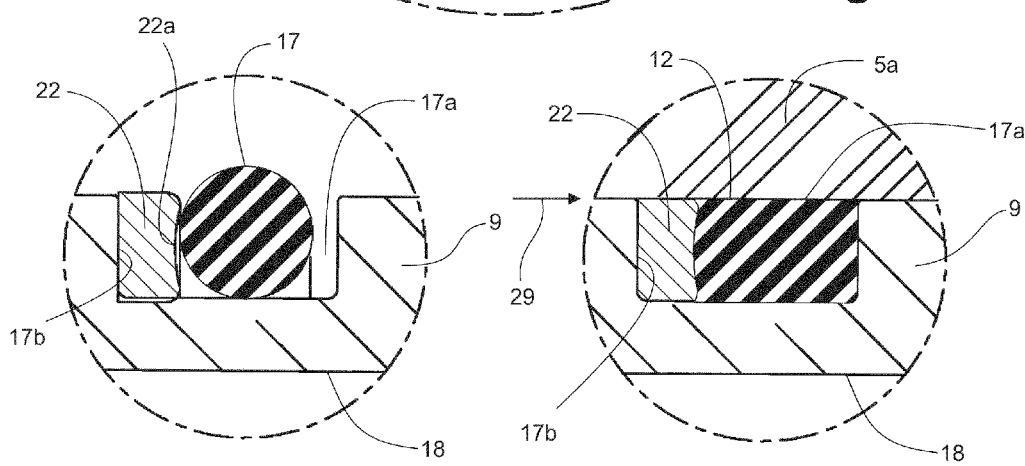
*Fig. 4B*  *Fig. 4C*

ANTI-EXTRUSION SEALING SYSTEM FOR THE OUTLET OF A PLASTIC-LINED COMPRESSED GAS CYLINDER

CROSS REFERENCE TO RELATED APPLICATIONS

This application claims the benefits under 35 U.S. 119(e) of U.S. Provisional Application Ser. No. 61/308,736, filed Feb. 26, 2010 and U.S. Provisional Application Ser. No. 61/308,751, filed Feb. 26, 2010, which are incorporated fully herein by reference.

FIELD OF THE INVENTION

The present invention relates to fibre-wrapped, plastic-lined cylinders, particularly to sealing systems within an end fitting of an outlet boss of the cylinder, and more particularly to anti-extrusion and anti-creep measures at the sealing interface.

BACKGROUND OF THE INVENTION

Fuel cylinders for liquefied natural gas (LNG), liquefied petroleum gas (LPG), and particularly for hydrogen gas (H2) are ideally as light as possible. Cylinder structures used to maintain the high pressures and remain lightweight include use of aluminum cylinders or liners wound with carbon fibres and plastic liners or bladders similarly wrapped in carbon fibres. The carbon fibre wraps provide the necessary structural integrity where less structurally-capable, yet low permeability, fuel-retaining liners are used.

Cylinder structures capable of containing high pressures utilize hemispherical or polar heads. Whether lightweight metal cylinders or plastic liners are used, one or more outlets are presently formed of metal. For example, a polar head of a fibre-wrapped, plastic lined vessel can be fit with a metal boss. Usually, the metal boss is integrated with the liner prior to wrapping with carbon fibres. The boss can have a partial polar shoulder which is over-wrapped as well with the carbon fibres. The boss is threaded and fit with an "end fitting" or insert—including a plug, valve or pressure regulator.

The boss itself is needed for installation of an end fitting or insert such as a valve or regulator. It is known that the conventional threaded connections between boss and insert are not adequate to block a leak path of the pressurized fluid within, and particularly challenging with low molecular weight gases.

Current versions of lightweight fuel cylinders typically comprise a plastic liner fit with a metal boss and then wrapped with carbon fibre. Due to the introduction of plastic liners, there is now a new problem introduced with sealing of the boss at the entrance to the cylinder. There is a problematic interface between the liner and the polar end ports used to access the interior of the cylinder. The interface of the plastic liner and the metal boss has the potential to leak.

Some manufacturers go to great lengths of providing a seal interface between the boss and the liner by leaving the bore of the boss free of any liner components and accepting conventional fittings. An example is a tongue and groove form of interface as set forth in U.S. Pat. No. 6,227,402 to Shimojima et al. wherein the plastic liner is integrated into annular grooves in the boss. Other forms where a boss embedded in the liner itself are set forth in U.S. Pat. No. 5,253,778 to Sirosh, U.S. Pat. No. 5,518,141 to Newhouse et al. and U.S. Pat. No. 7,549,555 to Suzuki et al. When a leak does occur, the cylinder cannot be repaired and is scrap.

A characteristic of plastic is a higher rate of creep under sustained loading. In this case, creep is exhibited at the seal interface of the liner and the insert. Seals typically comprise an elastomeric seal element compressed against rigid seat. With the introduction of plastic liners, the rigid seat is replaced with the plastic material. Over time, plastic tends to slowly move away from a sealing engagement with the seal element and pressurized fluid then can escape thereby.

It is known in the prior art to introduce a liner outlet into the bore of the boss. Accordingly, there has been an attempt to provide a seal between the plastic liner within the boss and the insert. In U.S. Pat. No. 5,938,209 to Sirosh et al. and U.S. Pat. No. 6,186,356 to Berkley et al., an O-ring is sandwiched axially between an annular end face of the liner and end face of the insert. In another form, as set forth in published US Application 2009/0071930 to Sato et al., an O-ring is located between the liner and the boss. Again, should a leak occur, the cylinder cannot be repaired and is scrap.

Other prior art arrangements include placing an O-ring circumferentially in an annular groove formed in the insert, the insert and O-ring portion protruding into and sealing against a cylindrical throat of the liner.

Other factors contributing to seal leakage include differential thermal expansion of the differing materials. The insert is usually aluminum or stainless steel which has a lower coefficient of thermal expansion than plastic which can also cause issues at the interface.

Accordingly, a new sealing system would overcome the deficiencies experienced by the prior art.

SUMMARY OF THE INVENTION

Embodiments described herein are directed to a sealing system formed between an outlet of a plastic liner extending into a bore of a boss. The liner outlet and the bore of the boss form a profiled bore. An insert, engageable with the profiled bore, forms a profiled surface for sealing with profiled bore. The liner outlet is retained along the bore of the boss for dimensional stability. The sealing system enables sealing using an annular sealing element and avoids extrusion of the seal element therebetween. Other embodiments provide secondary sealing using compressive interference of a tapered interface between the profiled bore and profiled surface. Other embodiments provide compression of any assembly clearance to obviate extrusion and optionally to preload the liner outlet for minimizing the effects of creep.

Accordingly in one broad aspect a sealing system for an outlet of a plastic-lined compressed gas cylinder is provided. The plastic-lined cylinder comprises a plastic liner and a boss. The boss has a bore for accessing the cylinder. The sealing system comprises a liner outlet of the plastic liner extending axially into the bore of the boss to form a profiled bore. The profiled bore comprises a liner section and a boss section. The liner outlet has an annular distal end having an axial position along the boss. The liner section comprises a cylindrical, sealing bore portion, and a tapered bore portion. The boss section comprises an insert-securing bore portion and a retaining shoulder for engaging the annular distal end at the axial position. The sealing system further comprises an insert having a profiled surface engageable with the profiled bore. The insert's profiled surface comprises an annular recess housing an annular seal element, a tapered compression surface adjacent the seal element, and a bore-securing surface. When the bore-securing surface axially engages the insert-securing bore portion, the insert's profiled surface engages the profiled bore and forms an annular assembly clearance between the seal element and the sealing bore portion. The seal element corresponds and seals with the sealing bore portion to form an annular, primary seal. The tapered compression surface corresponds and engages with the tapered bore portion for forming an annular tapered interface. The tapered interface compresses the liner outlet and closes the annular assembly clearance at about the seal element.

Accordingly in another broad aspect a method for sealing an outlet of a fibre-wrapped, plastic-lined cylinder is provided. The plastic-lined cylinder comprises a plastic liner and a boss. The boss has a bore for accessing the cylinder. The method comprises axially extending a liner outlet of the plastic liner into the bore of the boss to form a profiled bore. An annular distal end of the liner outlet is engaged against a stop in the boss for maintaining an axial position of the annular distal end in the profiled bore. An insert having a profiled surface is engaged with the profiled bore for forming an annular, primary seal and an annular tapered interface with the liner outlet. The primary seal is formed by engaging an annular seal element on the insert with a cylindrical, sealing bore portion of the profiled bore. The tapered interface is formed by engaging a tapered compression surface on the insert with a tapered bore portion of the profiled bore. The tapered interface compresses the liner outlet around the seal element. A bore-securing surface on the insert is engaged with an insert-securing bore portion of the profiled bore for securing the insert to the boss.

Accordingly in yet another broad aspect a method for servicing a sealing system of an outlet of a plastic-lined compressed gas cylinder is provided. The cylinder comprises a plastic liner and a boss. The boss has a bore for accessing the cylinder which is normally sealed with an insert. The method comprises disengaging the insert from the outlet of the cylinder for exposing a profiled bore of a liner outlet extending axially into the bore of the boss. An annular seal element located about the insert is replaced. The seal element normally sealably engages the profiled bore. At least one sealing surface located on the profiled bore is refurbished.

BRIEF DESCRIPTION OF THE DRAWINGS

FIG. 4A is an enlarged view of the liner, an annular tapered interface, an annular seal element and backer ring common to both embodiments of the inserts of FIGS. 2 and 3;

FIGS. 4B and 4C are enlarged, staged views of the seal element at the tapered interface of FIG. 4A, FIG. 4B illustrating the seal element before engaging the liner and FIG. 4C illustrating the seal element after engagement with the liner;

DETAILED DESCRIPTION OF THE PREFERRED EMBODIMENTS

Figure 1A:
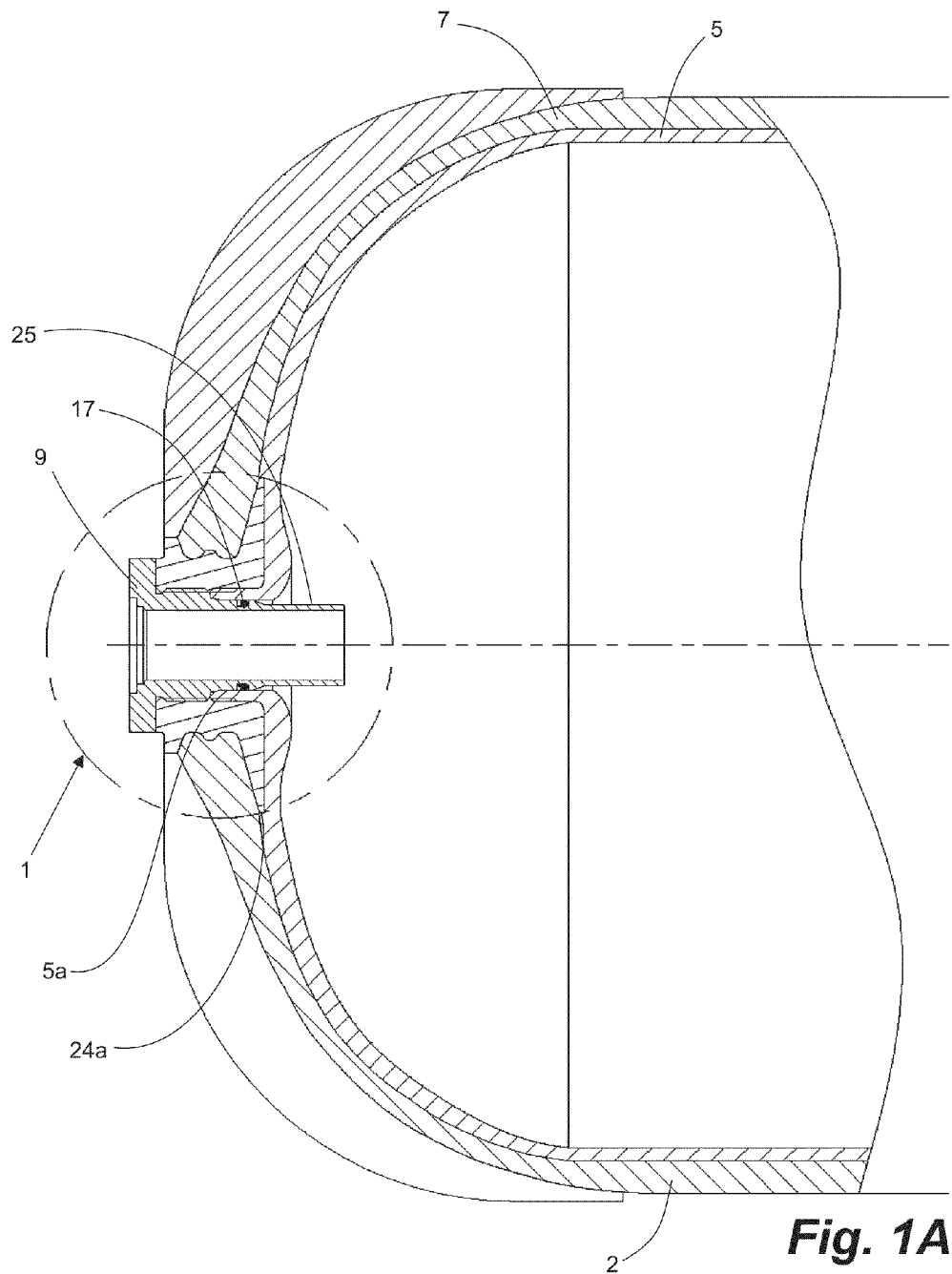
FIG. 1A is a partial cross-sectional view of a plastic-lined, fiber-wrapped cylinder according to one embodiment, the polar boss being fit with a plug-type of insert and the insert having a retaining shoulder.

Herein, embodiments are directed to a sealing system for an outlet of a plastic lined cylinder for compressed gas. The cylinder comprises a plastic liner having a liner outlet and a boss coupled with the liner outlet. The boss has a bore for accessing the cylinder. For storage of compressed gas, the liner is supported against bursting using an overlying structure such as a carbon fibre wrap. The plastic liner and boss are wound with carbon fibres to provide the necessary structural integrity. The boss and the liner are integrated through a fibre-wrapping to form the cylinder.

The liner outlet extends axially into a bore of the boss to form a profiled bore. The profiled bore is sealed by an insert engageable with the profiled bore. The insert has a corresponding profiled surface. When the insert is engaged with the boss, at least an annular primary seal is formed between an annular seal element of the profiled surface and the profiled bore. In one embodiment, an annular, tapered, secondary seal is also formed between the profiled surface and the profiled bore. The secondary seal can be formed by interference and compression at an annular tapered interface between the profiled surface and profiled bore. The liner outlet is restrained in the boss by retaining an annular distal end of the liner outlet against a stop.

In one embodiment, the stop is a retaining shoulder provided on the insert. In another embodiment, the stop is a retaining shoulder provided in the boss. In another embodiment, compression of the liner outlet at the tapered interface can also close any annular assembly clearance to block extrusion of the seal element at high pressures. Compression of the liner material can also minimize creep of the sealing surfaces otherwise susceptible to sustained sealing element and pressure loads. Further, the arrangements disclosed herein enable methods for refurbishing the sealing system. Should a leak develop over time, the liner or insert interfaces can be accessed for servicing and to quickly place the cylinder back into service.

FIGS. 1 to 11B illustrate an embodiment of the sealing system wherein the insert is provided with a retaining shoulder. The embodiments shown in FIGS. 1 to 11B are suitable and tested for use with the storage of conventional gas such as compressed natural gas (CNG) at pressures of about 250 bar.

With reference to FIGS. 1A, 1B, 2 and 5, the polar head 1 of a plastic-lined, fuel cylinder 2 is fit with a rigid boss 3, such as a metal boss, having a bore 4 therethrough for accessing the cylinder. The boss 3 has a flare 3a at a vessel end and a fuel opening 3b (FIG. 5) at an outer end for accessing the bore 4 of the boss and the interior of the cylinder or vessel. An outlet 5a of a liner 5 extends into the bore 4 of the boss 3 and is coupled to the boss 3. In an embodiment, the outer surface of the liner outlet is threaded 5b for coupling with an internal, threaded portion 3c of the boss. Alone or in addition to threaded coupling, an adhesive can also be used between the liner outlet 5a and the boss 3 for coupling the liner outlet 5a to the boss 3. The boss 3 and liner 5 are wrapped with a carbon fibre wrap 7, sandwiching the flare 3a of the boss within the fibre-wrap and therefore integrated into the polar head 1 of the cylinder 2. The bore 4 of the boss 3 is sealed by an insert 9. The insert 9 is releasably engageable with the boss 3.

Figure 1B:
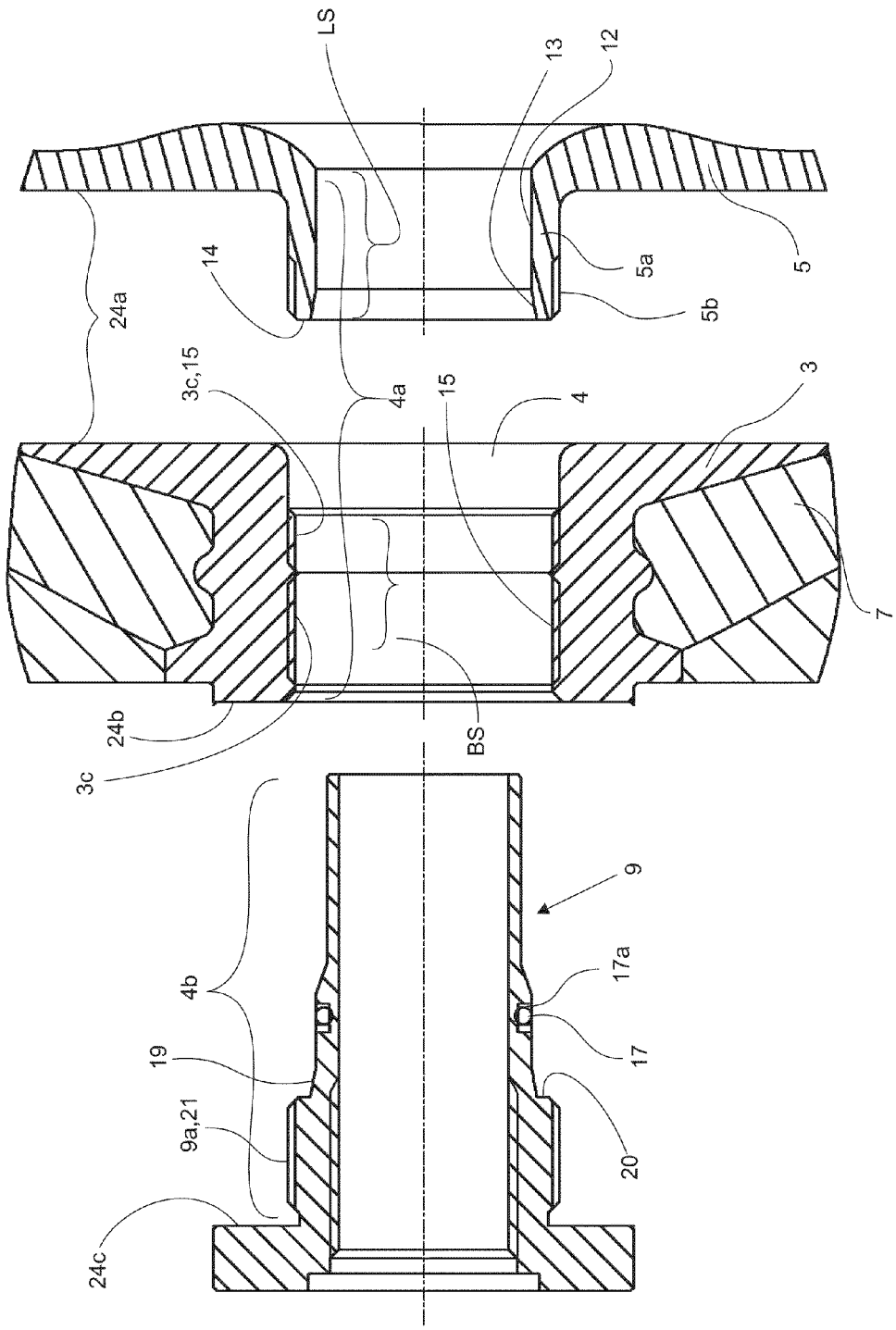
FIG. 1B is an exploded view of the polar boss of FIG. 1 fit with a flow through-type of insert, the insert shown prior to engagement with the boss and the liner outlet shown prior to engagement with the boss.
Figure 2:
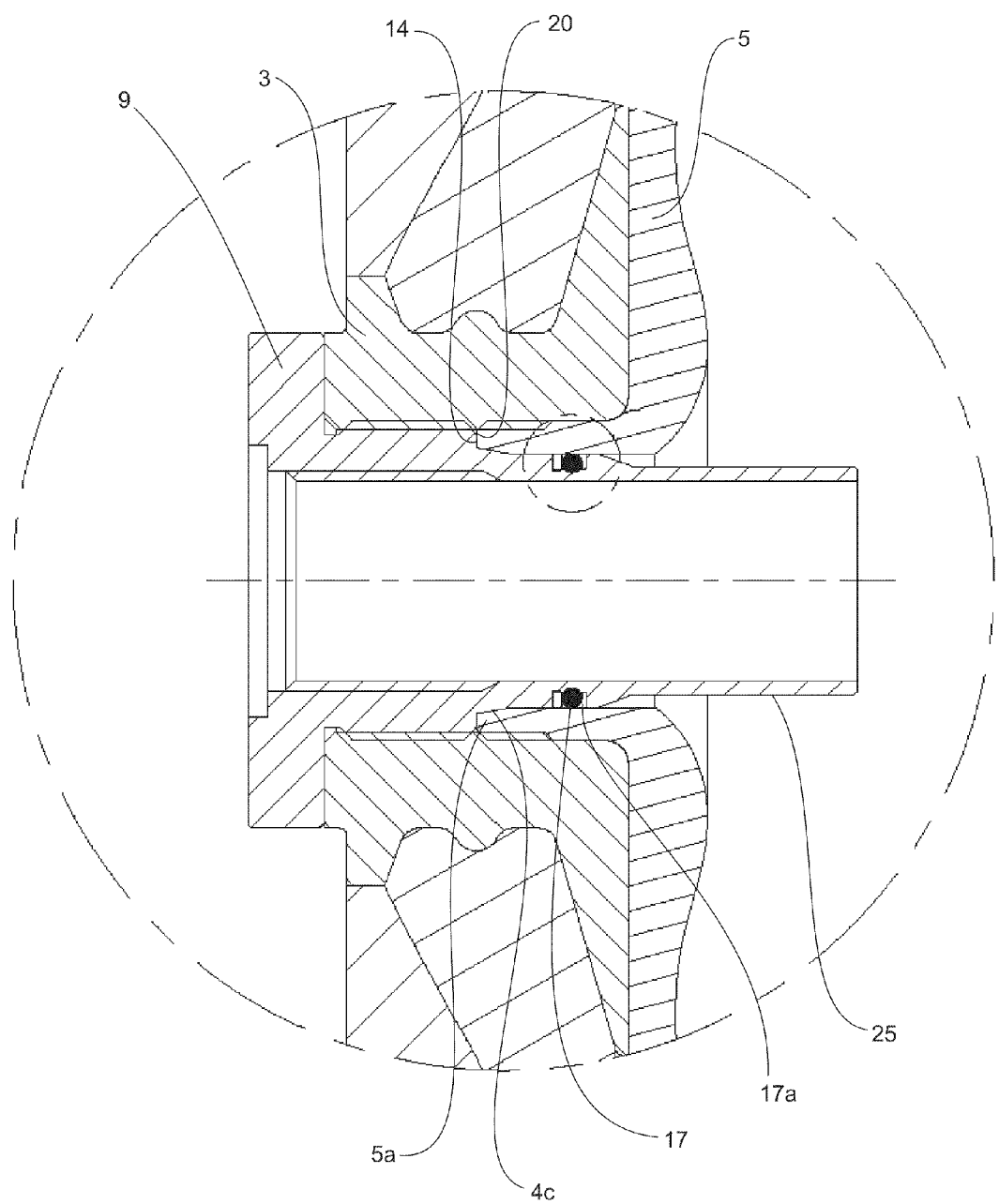
FIG. 2 is an enlarged view of the polar boss of FIG. 1 fit with a flow through-type of insert.
Figure 3:
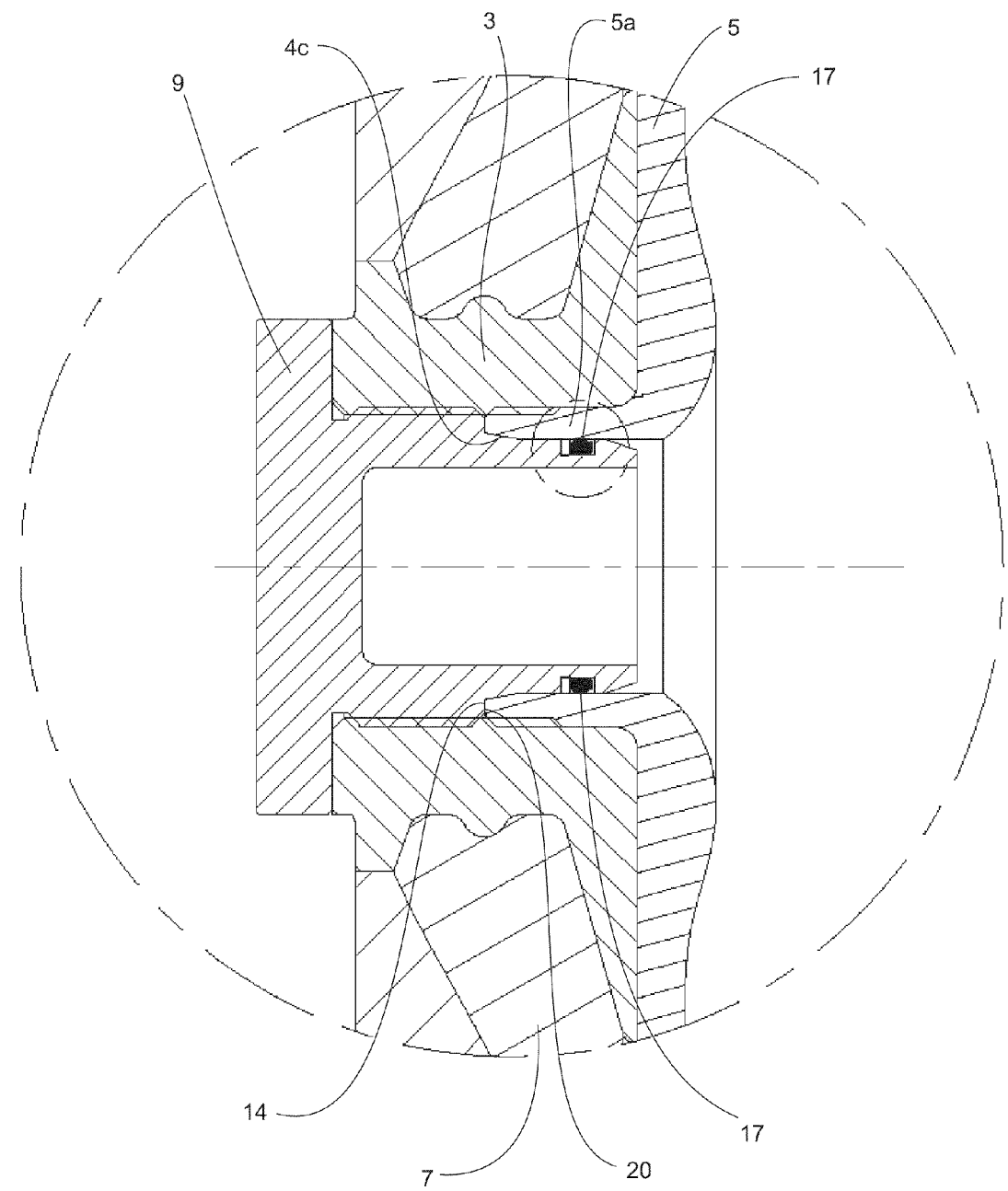
FIG. 3 is an enlarged view of the polar boss of FIG. 1 fit with the plug-type of insert.
Figure 5:
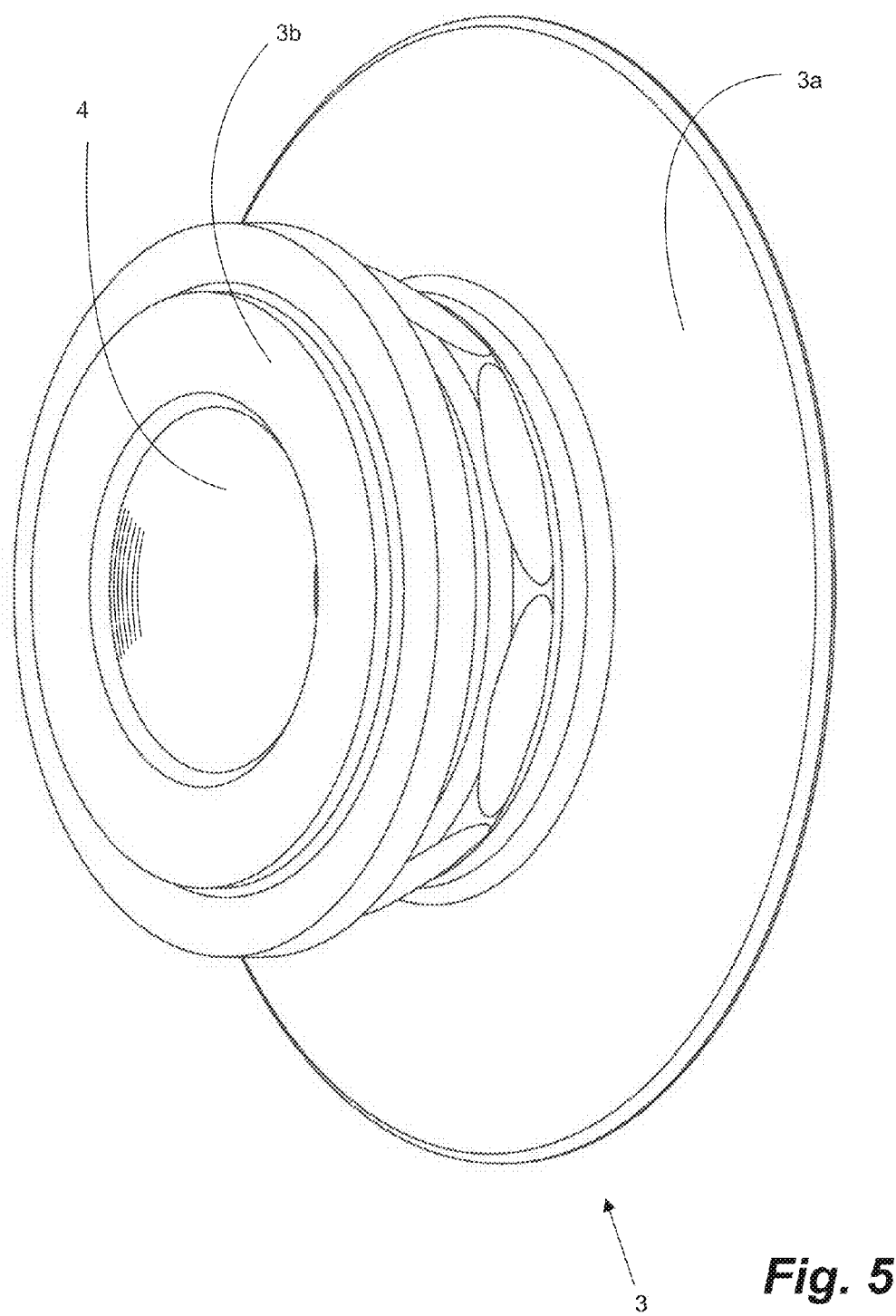
FIG. 5 is an isometric view of one embodiment of a boss.

As shown in FIG. 1B, the insert 9 has a generally cylindrical body which includes an external, threaded portion 9a which engages with the internal, threaded portion 3c of the boss 3 for releasably coupling the insert 9 with the boss 3. Sealing of the vessel's pressurized fuel contents is performed at the interface of the insert 9 and the liner outlet 5a.

Having reference to FIG. 4A, a sealing system between the insert 9 and the liner outlet 5a comprises a profiled bore 4a (best illustrated in FIG. 1B) formed by the liner outlet 5a extending into the bore 4 of the boss. The insert 9 has a complementary profiled surface 4b (best illustrated in FIG. 1B) for engagement with the profiled bore 4a. Axially spaced, as referenced from the inside of the vessel or cylinder 2, the profiled bore 4a comprises a liner section LS (best illustrated in FIG. 1A) and a boss section BS (best illustrated in FIG. 1A). The liner section LS comprises a cylindrical, sealing bore portion 12, a tapered bore portion 13, and an annular distal end 14. The annular distal end 14 has an axial position in the bore 4. The boss section BS comprises an insert-securing bore portion 15. Preferably, the insert-securing portion 15 is the internal threaded portion 3c of the boss. The insert's profiled surface 4b comprises an annular seal element 17 fit to an annular recess 17a formed circumferentially about a cylindrical plug portion 18 of the insert 9 for corresponding and sealing with the sealing bore portion 12 during insertion of the insert 9. A typical annular seal element 17 is a form of O-ring. One suitable material for the O-ring, for many compressed gases including CNG, is nitrile 700 LT.

In this embodiment, the profiled surface 4b of the insert 9 further comprises a tapered compression surface 19, a retaining shoulder 20 and a bore-securing surface 21. Preferably, the bore-securing surface 21 is the external threaded portion 9a of the insert. The insert's profiled surface 4b engages the profiled bore 4a when the bore-securing surface 21 axially engages the insert-securing portion 15.

In operation, threaded insertion of the insert 9 locates the insert's seal element 17 with the liner's sealing bore portion 12 to form an annular primary seal between the insert 9 and the liner outlet 5a. Further, the insert's tapered compression surface 19 axially engages the liner section's tapered bore portion 13 at an annular tapered interface 4c to form an annular, tapered secondary seal between the insert 9 and the liner outlet 5a. The tapered interface 4c is a truncated frustum of a right circular cone. The insert's retaining shoulder 20 engages and axially retains the distal end 14 of the liner outlet 5a for maintaining the axial position of the annular distal end 14 at the axial position in the bore 4 of the boss 3.

As shown in FIGS. 4A and 4C, the seal element 17 is fit within the cylindrical plug portion 18 of the insert 9. The cylindrical plug portion 18 engages the cylindrical sealing bore portion 12 of the liner section LS of the profiled bore 4a forming a small annular assembly clearance or gap 29 (FIG. 4C) therebetween (not distinguishable at the resolution of the drawings). The assembly clearance enables the seal element 17 to enter the cylindrical sealing bore portion 12 during assembly. However, this assembly clearance can also introduce challenges at higher pressures. The annular seal element 17, under a combination of factors including the seal material properties, the dimensions of the assembly clearance and the pressure, would be subject or vulnerable to extrusion out of the annular recess 17a and into the assembly clearance.

As shown in FIG. 4B, the annular seal element 17 is elastomeric and in the uncompressed, free state, has a first relaxed cross-section, shown in FIG. 4B as a circular cross-section of an O-ring embodiment. As shown in FIG. 4C, when the annular seal element 17 engages the sealing bore portion 12, it is compressed into the annular recess 17a, substantially assuming the cross-sectional shape of the recess 17a. A backer ring 22 can also be provided in the annular recess 17a. The backer ring 22 is located in the annular recess 17a between the annular seal element 17 and a wall 17b of the annular recess 17a between the tapered interface 4c and the annular seal element. The backer ring 22 can include an annular and concave alignment recess 22a into which the annular seal 17 compresses. Backer rings can assist in resisting movement of the annular seal element 17 during insert installation and when compressed, expand radially to reduce risk of extrusion. The compressive action of the annular seal element 17 into concave alignment recess 22a can also aid in the radial displacement of the backer ring 22 within the annular recess 17a and blockage of the assembly clearance. Suitable backer ring material includes 90 durometer nitrile.

Also, it is found that the compression can also form a direct insert-to-liner seal or the secondary seal at the tapered interface 4c.

The liner outlet 5a is restrained from axial movement by the retaining shoulder 20, such movement including that from axial extrusion or creep under compressive forces imparted by the tapered compression surface and cylinder pressures.

As a result a simple and reliable sealing system or arrangement is achieved.

Figure 6:
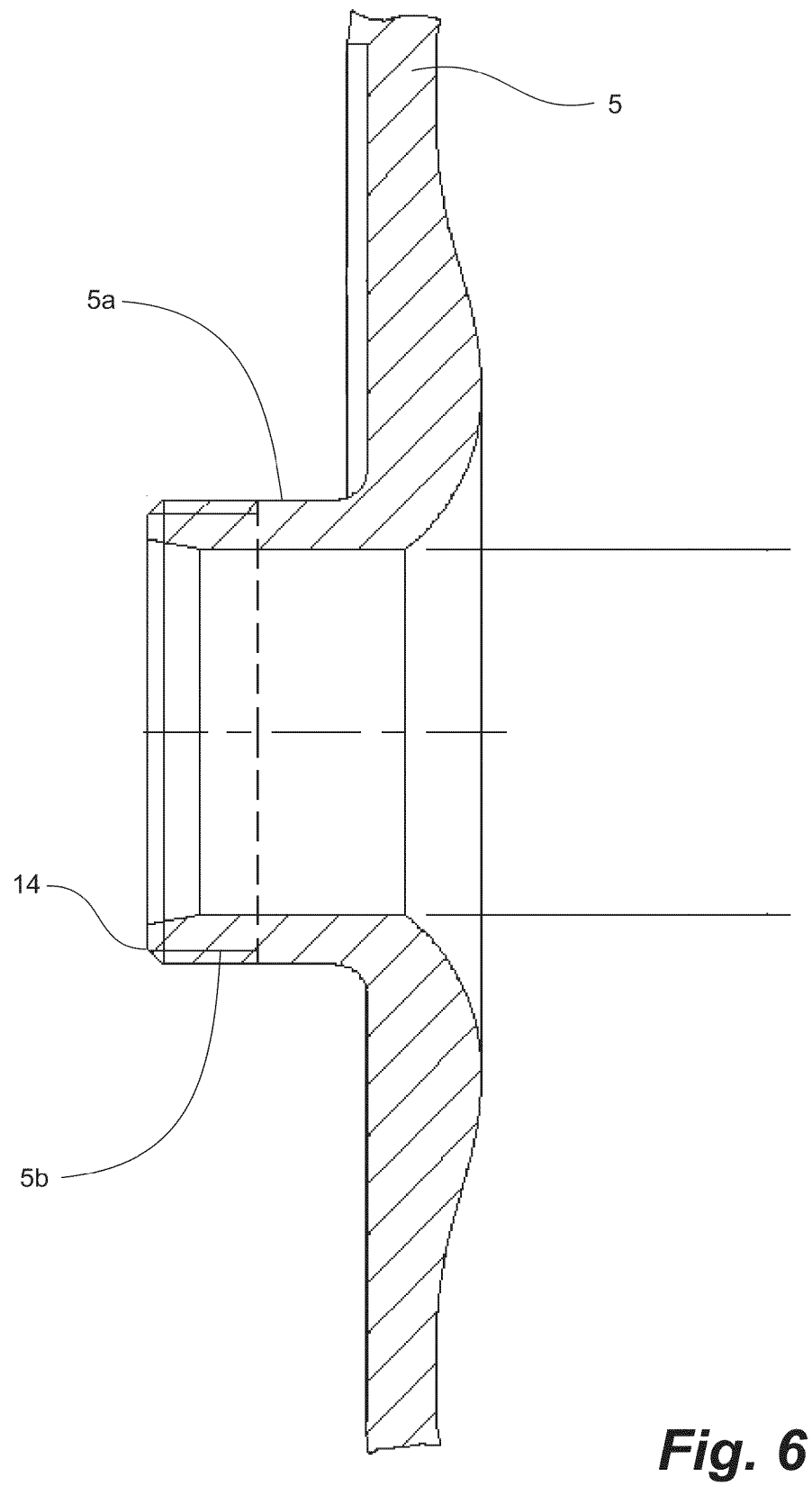
FIG. 6 is a partial cross-sectional view of the liner and liner outlet compatible with a boss such as that of FIGS. 1 through 4 and 5.
Figure 7A:
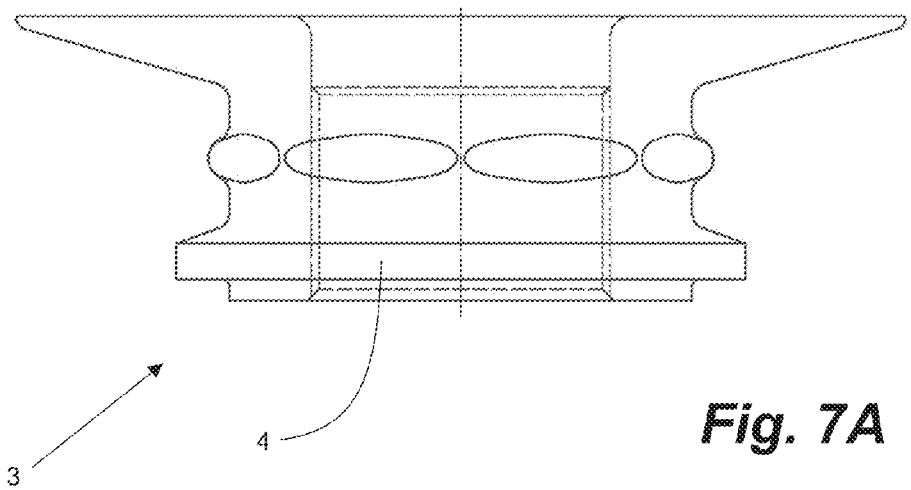
FIGS. 7A and 7B are side and cross-sectional views respectively of a form of polar boss.
Figure 7B:
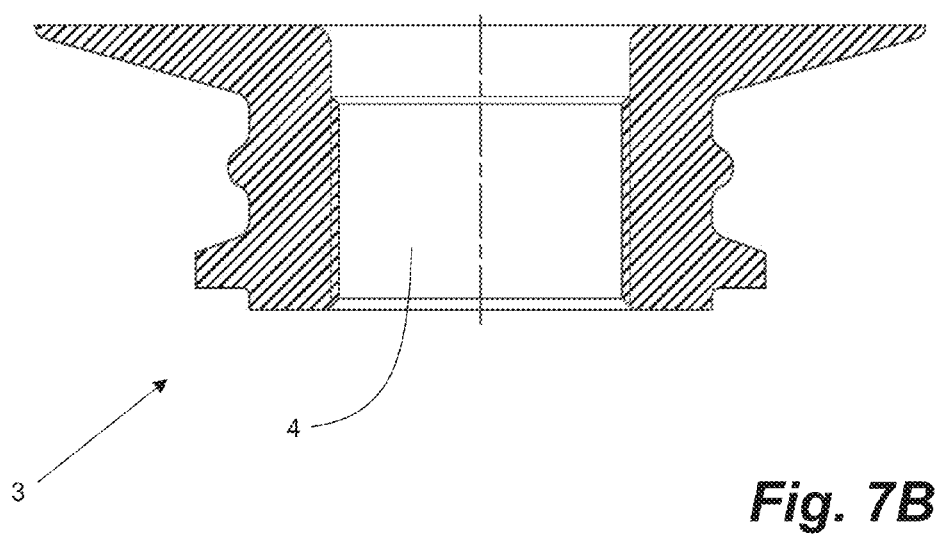
Figure 8:
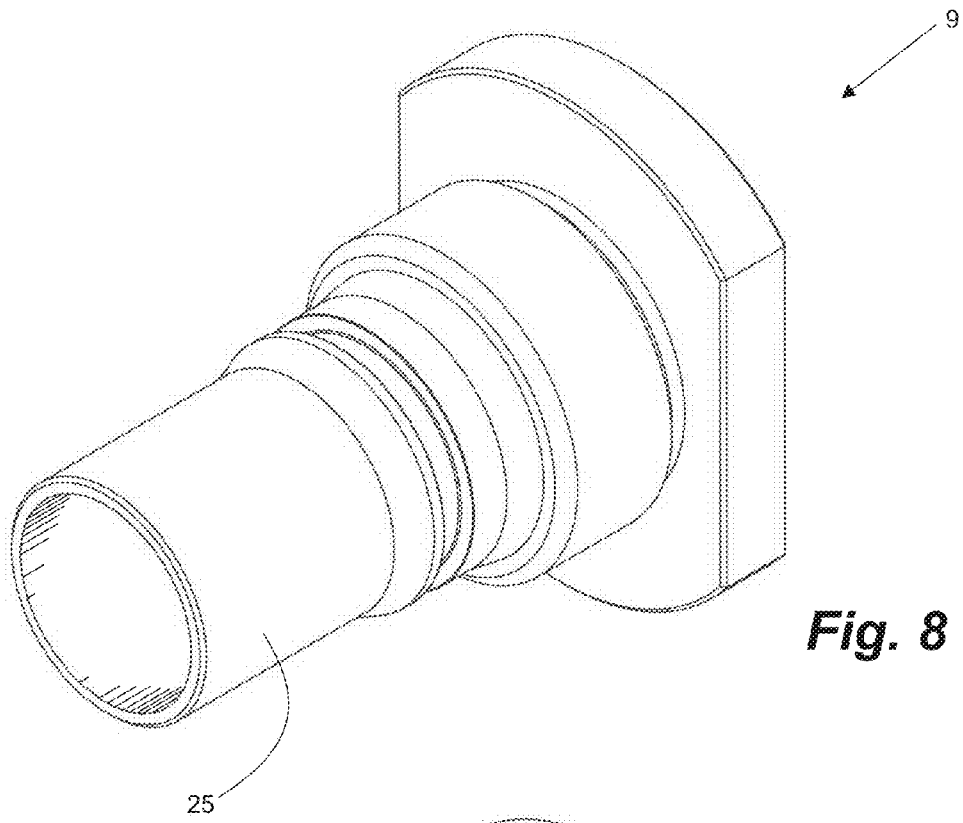
FIG. 8 is an isometric view of the flow through-type insert according to FIG. 2.
Figure 9:
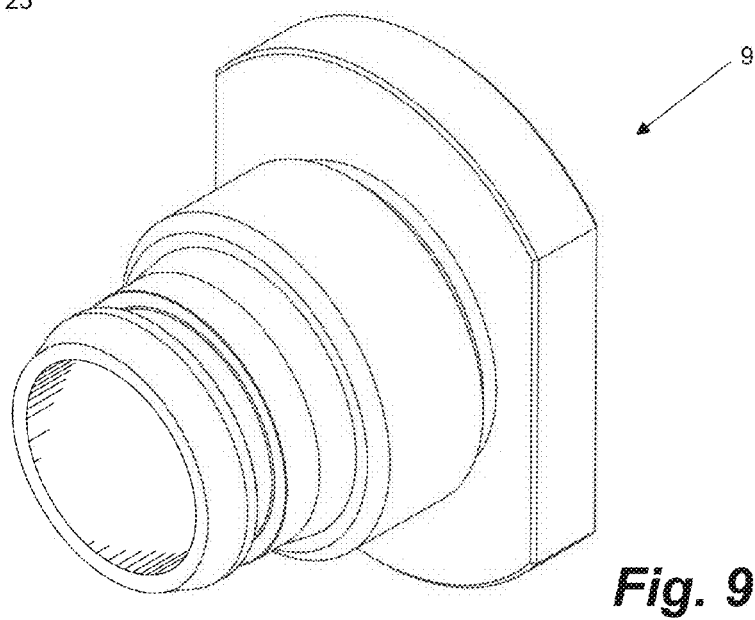
FIG. 9 is an isometric view of the plug-type insert according to FIGS. 1 and 3.
Figure 10A:
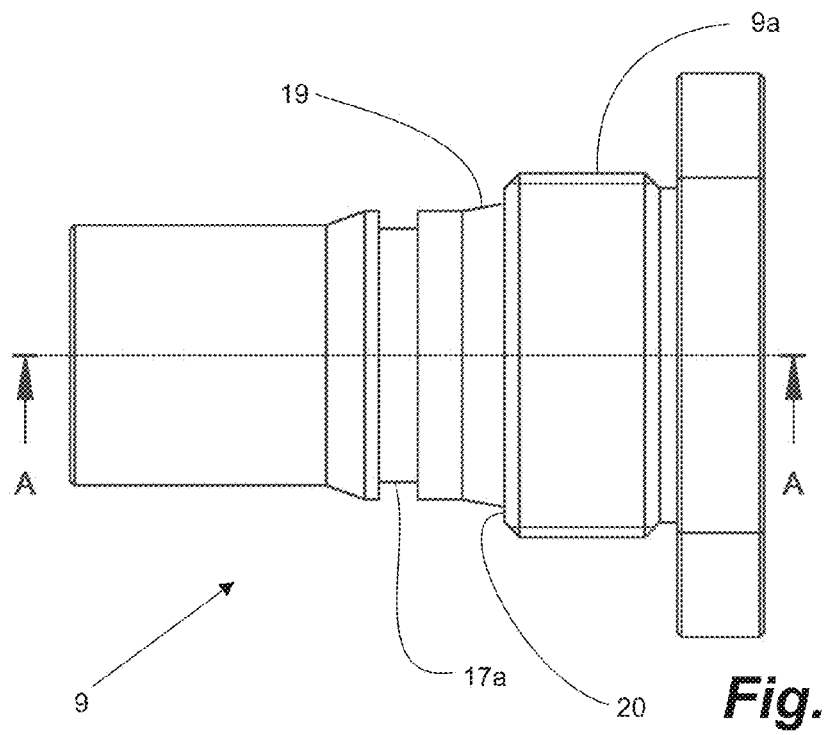
FIGS. 10A and 10B are side and cross-sectional views respectively of the flow through-type insert according to FIG. 2.
Figure 10B:
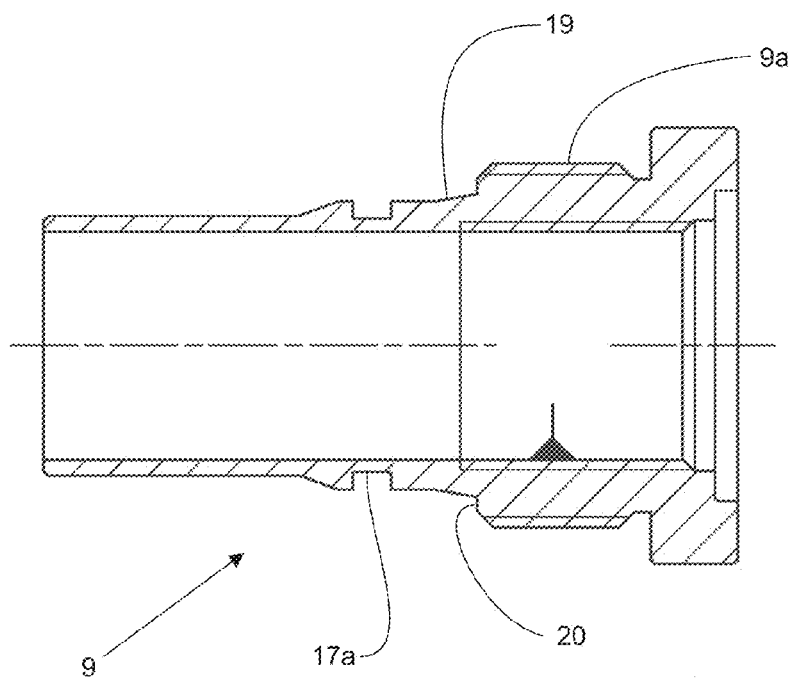
Figure 11A:
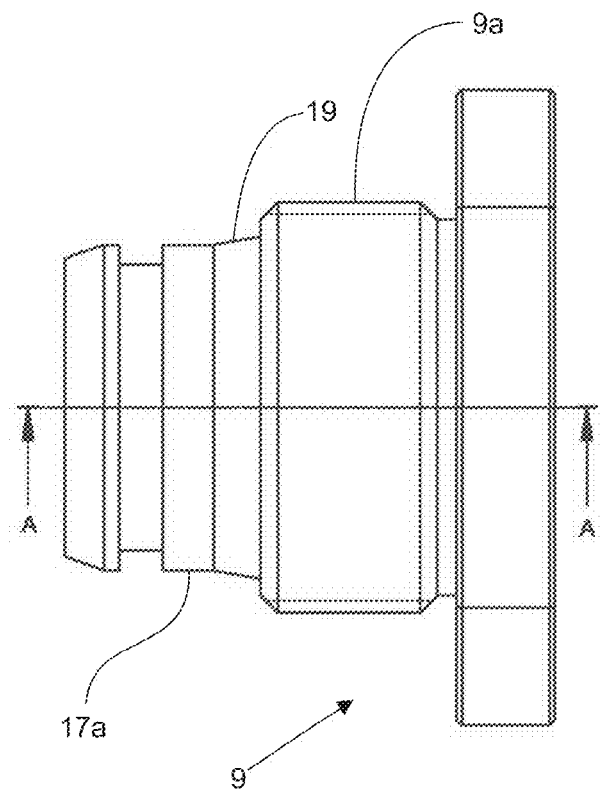
FIGS. 11A and 11B are side and cross-sectional views respectively of the plug-type insert according to FIGS. 1 and 3.
Figure 11B:
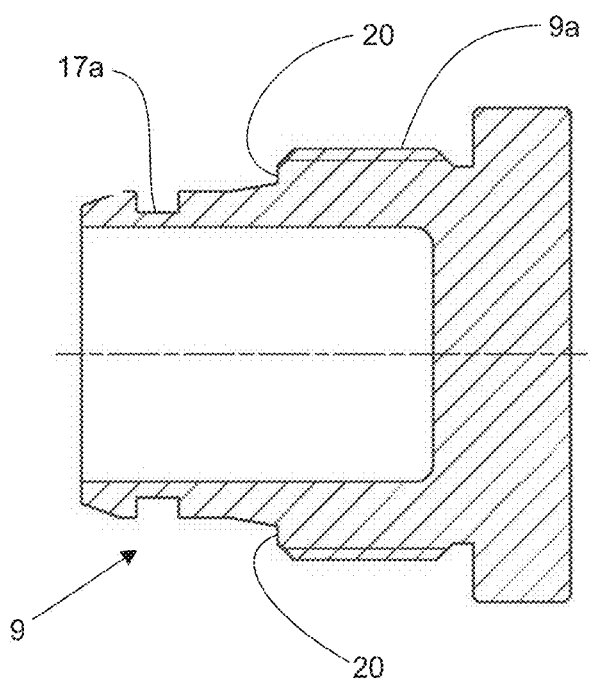
Figure 12:
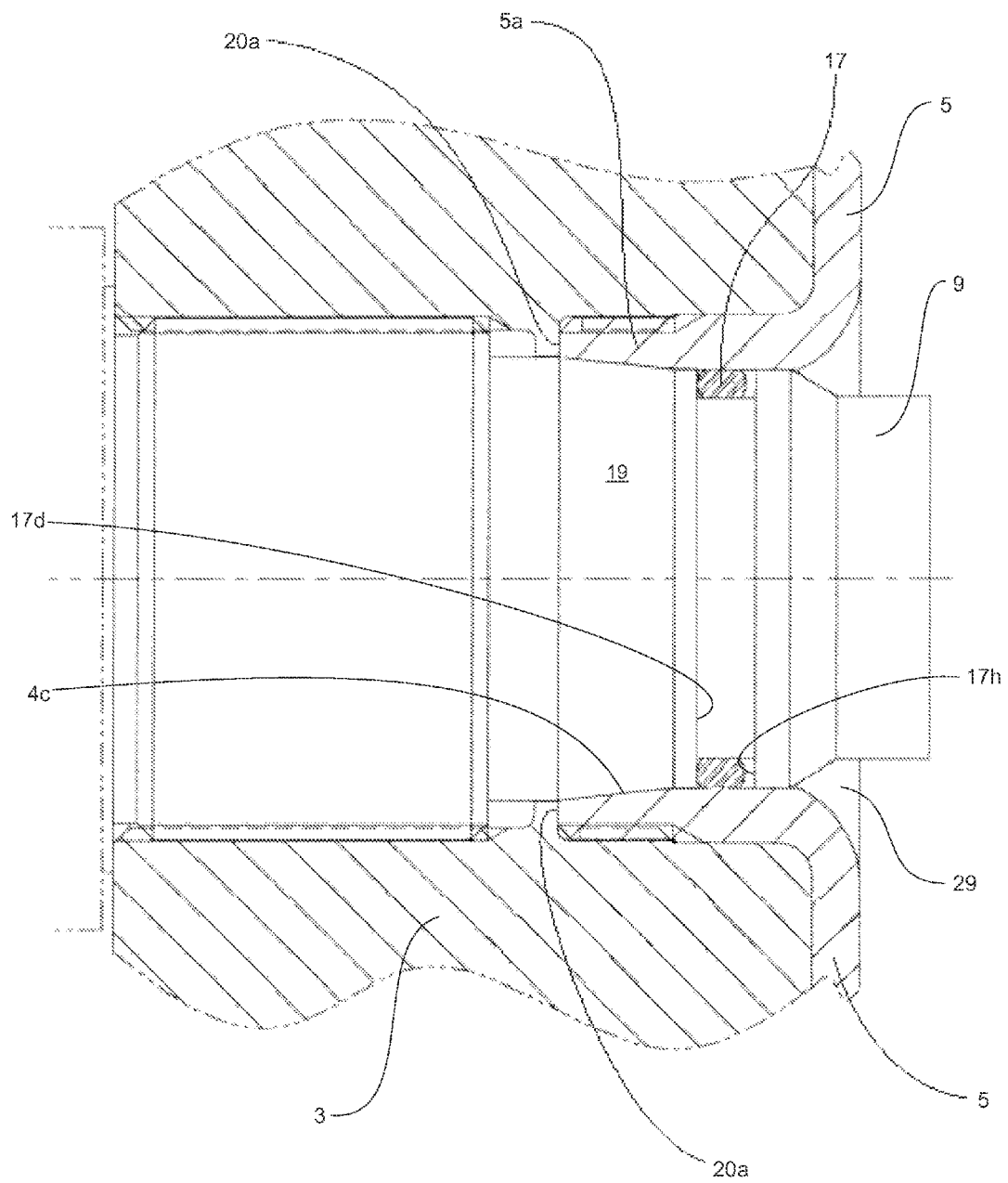
FIG. 12 is a cross-sectional view of another embodiment of the boss with the insert installed therein, the boss having the retaining shoulder and the insert having the seal element.
Figure 13:
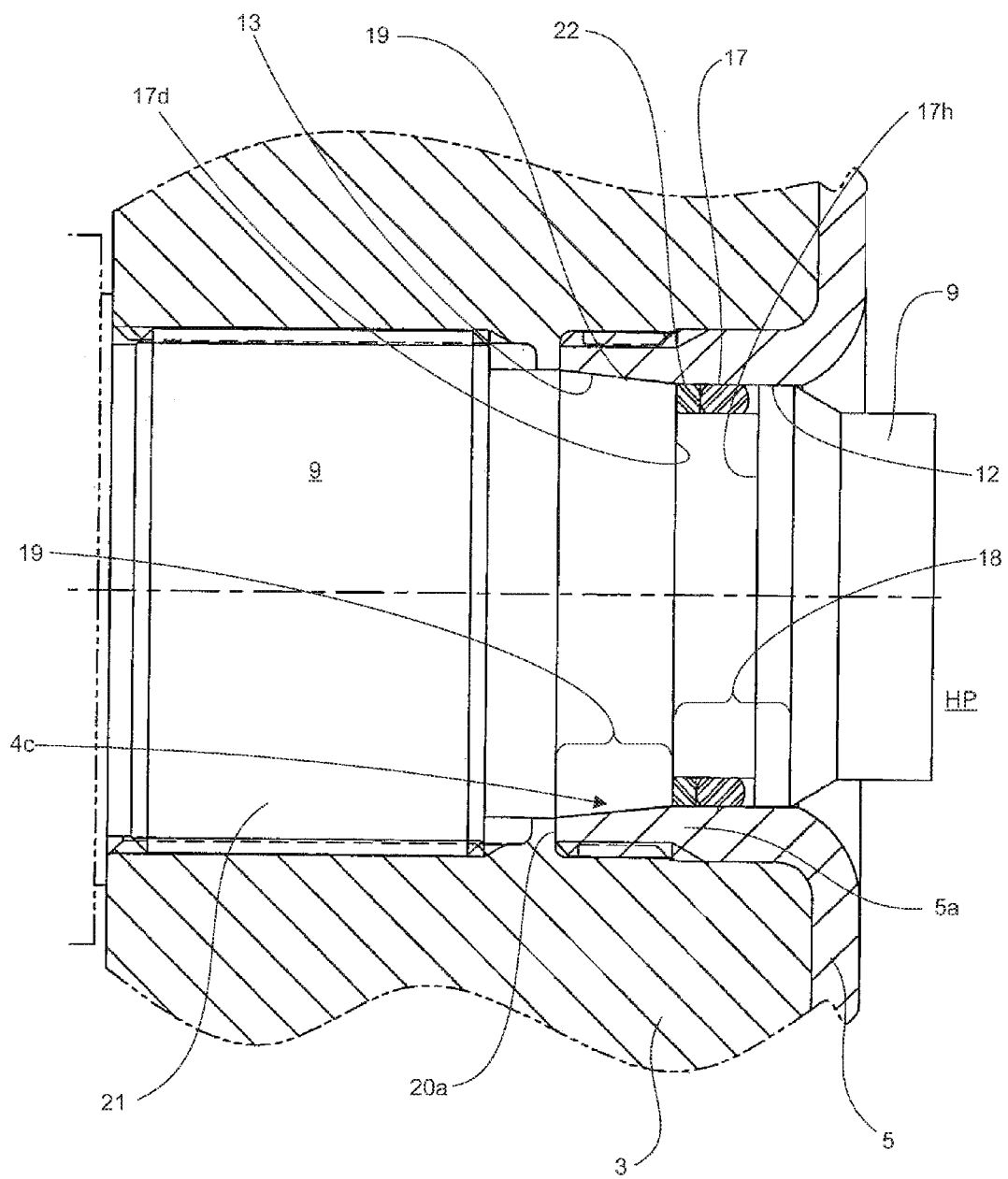
FIG. 13 is a cross-sectional view of a further embodiment of the boss and the insert installed therein, the boss having the retaining shoulder and the insert having the seal element and the backer ring.
Figure 14:
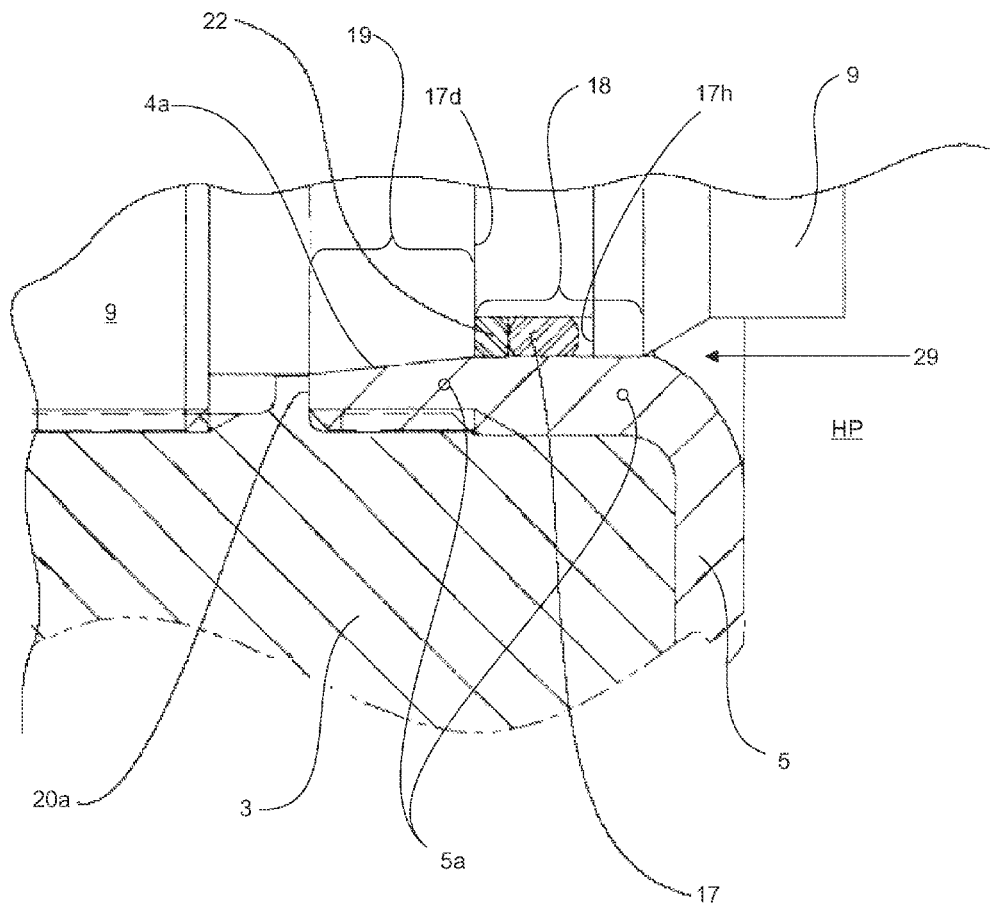
FIG. 14 is a partial cross-sectional view of the insert's profiled surface and the boss's profiled bore according to FIG. 13.

In one embodiment of the liner as shown in FIG. 6, the liner 5 is a bladder comprising about 5 mm of high density polyethylene (HDPE) which is suitable for natural gas. The cylindrical sealing surface can be about 33.3 mm in diameter, 20 mm in axial length and the outer diameter of the liner outlet 5a is about 42 mm for a liner thickness of about 4.35 mm. The tapered compression surface 19 is about 5.4 mm in length axially and has taper of 20 degrees from the axis.

In another embodiment of the liner, the liner 5 could include a supplemental layer of EVOH EVAL F101B for improved resistance to permeability of the fuel gas.

The liner outlet 5a is axially aligned with the boss 3 to maintain the axial position of the annular distal end 14 in the boss's profiled bore 4a. The insert 9 is axially aligned with the boss 3 so that the retaining shoulder 20 engages and retains the annular distal end 14 at the axial position when the tapered compression surface 19 engages the tapered sealing bore portion 13. In one embodiment, axial alignment between the boss 3 and the liner 5 is provided as follows: the boss 3 is provided with a first annular datum surface 24a and a second annular datum surface 24b (best illustrated in FIGS. 1A and 1B). The insert 9 is provided with a terminating outer 24c. The datum surface 24a is provided between the flare 3a of the boss 3 (which is ultimately covered in fibre-wrap) and a surface of the polar head end of the liner 5 (preferably machined to correspond to the boss flare 3a, such as a flat surface perpendicular to the vessel axis. The datum surface 24b is provided at the fuel opening 3b of the boss. The annular distal end 14 of the liner outlet 5a is axially spaced a reference distance from the annular datum surface 24a. As the distance from the fuel opening 3b of the boss to the flare 3a of the boss is known, distance of the annular distal end from the fuel opening 3b of the boss can be calculated. This forms a second reference distance. The retaining shoulder 20 is spaced from the outer terminating shoulder 24c by a distance equal to the second reference distance so that when the terminating outer shoulder 24c engages the annular datum surface 24b, the retaining shoulder 20 engages and retains the annular distal end 14 at the axial position when the tapered compression surface 19 is engaged with the tapered bore portion 13.

The boss 3 and insert 9 are typically formed of aluminum alloy such as anodized AA6061-T6 ASTM B221. The liner outlet 5a can be secured by a metal-bonding adhesive to the inside of the boss 3. The adhesive can assist with one or more aspects including securing the liner outlet 5a to restrain the liner outlet within the boss during assembly and to fill inconsistencies in the mating of the liner and boss for maintaining dimensional stability. A suitable adhesive is a two-component, high peel strength, metal-bonding adhesive. An example of a suitable adhesive includes Loctite™ U05-FL (Trademark of Henkel, Ohio USA).

In an embodiment of the insert 9 as shown in FIGS. 1A, 1B, 2, 8, 10A and 10B, the insert 9 includes an additional tube extension 25 which extends into the interior of the cylinder 2. During the filling and emptying of the cylinder 2, the gas flow is throttled through the insert 9, or a fitting installed to the insert 9. Pressurization of the cylinder 2 can result in localized temperature increases and decompression can result in temperature decreases. The tube extension 25 can act to shift such thermal effects to the interior of the cylinder 2 and can also act as a static build-up accumulator away from the plastic surface. In any event, grounding of the insert 9 to an exterior ground, such as the mounting assemblies can bleed off static build-up.

FIGS. 12 to 17 illustrate an embodiment of the sealing system wherein the axial position of the annular distal end 14 of the liner outlet 5a in the bore 4 of the boss 3 is maintained by a retaining shoulder 20a formed in the boss 3. The embodiments shown in FIGS. 12 to 17 have been shown suitable for use with the storage of compressed gas at high service pressures of about 700 bar (with a safety factor of 1.25 or pressures of about 875 bar). The liner 5 illustrated in FIGS. 12 to 17 is well suited to contain compressed gas at pressures ranging from about 250 bar to about 875 bar and at temperatures ranging from about −40° C. to about 85° C. The compressed gas can be hydrogen, helium or methane. The liner 5 suited for storage of such gases at pressures stated above can be a monolayer bladder or a multilayer bladder comprising a EVOH EVAL F101B layer, a BASELL LUPOLEN 4261A (Trademark of LyondellBasell Industries Holding B. V., Rotterdam Netherlands) layer and a layer of DUPONT BYNEL 40E529(Trademark of DuPont, Del. USA).

The sealing system illustrated in FIGS. 12 to 17 and the sealing system illustrated in FIGS. 1A to 11B have common elements. The common elements are the profiled bore 4a formed by the liner outlet 5a extending partially into the bore 4 of the boss 3 and the insert 9 having a profiled surface 4b. The profiled bore 4a has the cylindrical sealing bore portion 12, the tapered bore portion 13 and the insert-securing portion 15. The profiled surface 4b of the insert 9 comprises the annular seal element 17 located in the recess 17a in the cylindrical plug portion 18, the tapered compression surface 19 and the bore-securing surface 21. A difference between the sealing system described in FIGS. 1A to 11B and the sealing system described in FIGS. 12 to 17 is that in the sealing system described in FIGS. 1A to 11B the retaining shoulder 20 is located on the insert 9 and in the sealing system described in FIGS. 12 to 17 the retaining shoulder 20a is located on the boss 3. The retaining shoulder extends radially into the bore 4 of the boss. Also, in the sealing system described in FIGS. 12 to 17, the annular tapered interface 4c (portion where the tapered bore portion 13 meets the tapered compression surface 19) is substantially immediately adjacent the annular recess 17a housing the annular seal element 17. As shown in FIGS. 12-15, the annular recess 17a is formed circumferentially about the cylindrical plug portion 18 and is bound by upstream or high pressure wall 17h and downstream wall 17d. The tapered compression surface 19 is substantially immediately adjacent the downstream wall 17d. The cylindrical plug portion 18 extends into the vessel interior from the high pressure wall 17h. The sealing system described in FIGS. 12 to 17 generally works in the same manner as the sealing system described in FIGS. 1A to 11B except that the function of the tapered interface 4c in FIGS. 12 to 17 is more directed towards providing compression of the liner outlet 5a around the annular seal element 17. Compression of the liner outlet 5a at the tapered interface 4c aids in anti-extrusion of the annular seal element 17 from the annular recess 17a at the downstream wall 17d and also resists reactive creep from around the annular seal element 17. More detailed functioning of the tapered interface 4c in FIGS. 12 to 17 is explained below.

In the sealing system described in FIGS. 12 to 17, a small annular assembly clearance 29 (FIGS. 12 and 14) is provided between the cylindrical plug portion 18 of the insert 9 and the cylindrical sealing bore portion 12 of the liner section LS to enable the annular seal element 17 to enter the cylindrical sealing bore portion 12 during assembly. The annular assembly clearance 29 is not distinguishable at the resolution of the drawings. At high pressures, the annular seal element 17 can extrude from the annular recess 17a at the downstream wall 17d and into the annular assembly clearance 29. Compression of the liner outlet 5a at the tapered interface 4c can act to reduce and close the assembly clearance for avoiding opportunity for extrusion of the annular seal element 17. The tapered interface 4c is located downstream from normally-pressurized gaseous contents of the vessel 2. The tapered interface 4c is caused to be in such intimate interference and compressive contact as to effectively eliminate the annular assembly clearance and thus obviate and tendency or opportunity for extrusion. In an embodiment, the tapered interface 4c is immediately adjacent the annular recess 17a, ensuring any assembly clearance is closed immediately adjacent the annular seal element 17.

The insert's annular seal element 17 imposes a radial sealing load on the cylindrical sealing bore portion 12. At high pressures, over time, liner creep in response to sustained radial sealing load can lessen the sealing contact and result in leakage past the annular seal element 17. The annular seal element 17 can also extrude from the annular recess 17a into the annular assembly clearance when the sealing contact is lessened. This problem can be overcome by sufficiently pre-stressing the liner 5 around the annular seal element 17. Threaded engagement of the insert 9 compresses the tapered compression surface 19 and compressively loads the liner outlet 5a at the tapered bore portion 13, the compressive influence including the material of the liner about the cylindrical sealing bore portion 12. The tapered bore portion 13 is compressed between the insert's tapered compression surface and the boss 3 at the tapered interface 4c. The load imparts sufficient pre-stress in the liner 5 to resist and counteract creep.

A threshold compression or pre-determined amount of pre-stress can be controlled. In one embodiment, the threshold compression is controlled by monitoring the torque necessary to set the insert 9 into the profiled bore 4a. In this embodiment, the insert's profiled surface 4b is threadably engaged with the profiled bore 4a. The insert 9 is rotated to engage the tapered bore portion with the tapered compression surface for compressing the liner outlet 5a around the annular seal element 17. The torque necessary to engage the tapered bore portion with the tapered compression surface to a threshold compression is monitored. Rotation of the insert 9 is stopped when a threshold torque signifies the threshold compression has been achieved. As the insert 9 is threaded into the profiled bore 4a the tapered surface 19 meets the tapered bore portion 13 and the tapered bore portion 13 is compressed. The torque necessary to rotate the insert 9 increases to the threshold torque. When the torque reaches the threshold torque, sufficient compression has been achieved. Further, the retaining shoulder 20a engages the annular distal end 14 of the liner 5, firstly as a stop for preventing axial movement of the liner outlet 5a to maintain dimensional integrity and optionally, secondly, for imparting additional compression.

In another embodiment, the threshold compression is controlled by determining a corresponding axial threaded insertion and forming the insert 9 with the outer terminating shoulder 24c (such as the diametral change at the hexagonal tool) to engage the boss 3 when the necessary threaded insertion has been achieved. One can match the datum surface 24 on the boss 3 with the terminating shoulder 24c on the insert 9, the axial positioning of each of which being calculated to stop the axial insertion of the insert by "bottoming" of the terminating shoulder 24c against the boss's datum surface 24b when the threshold compression is achieved. The axially spacing of the elements of the insert 9 and the elements of the boss 3, are dimensionally spaced so as to: locate the O-ring seal 17 in the cylindrical sealing bore portion, engage and compress liner's tapered bore portion 13, and axially retain the annular distal end 14 of the liner upon or prior to the insert's outside components engage or bottom out on the boss's outside face.

Figure 15:
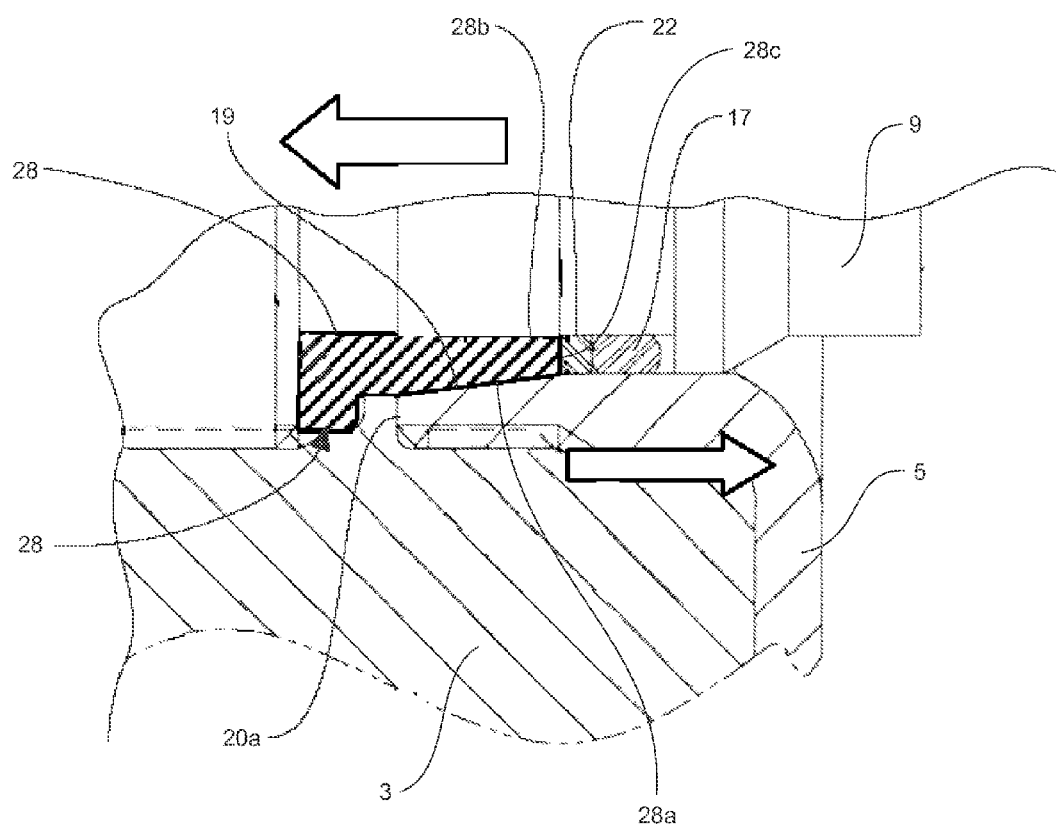
FIG. 15 is a partial cross-sectional view of the profiled surface and profiled bore according to FIG. 13 being fit with a backpressure anti-extrusion insert.
Figure 16:
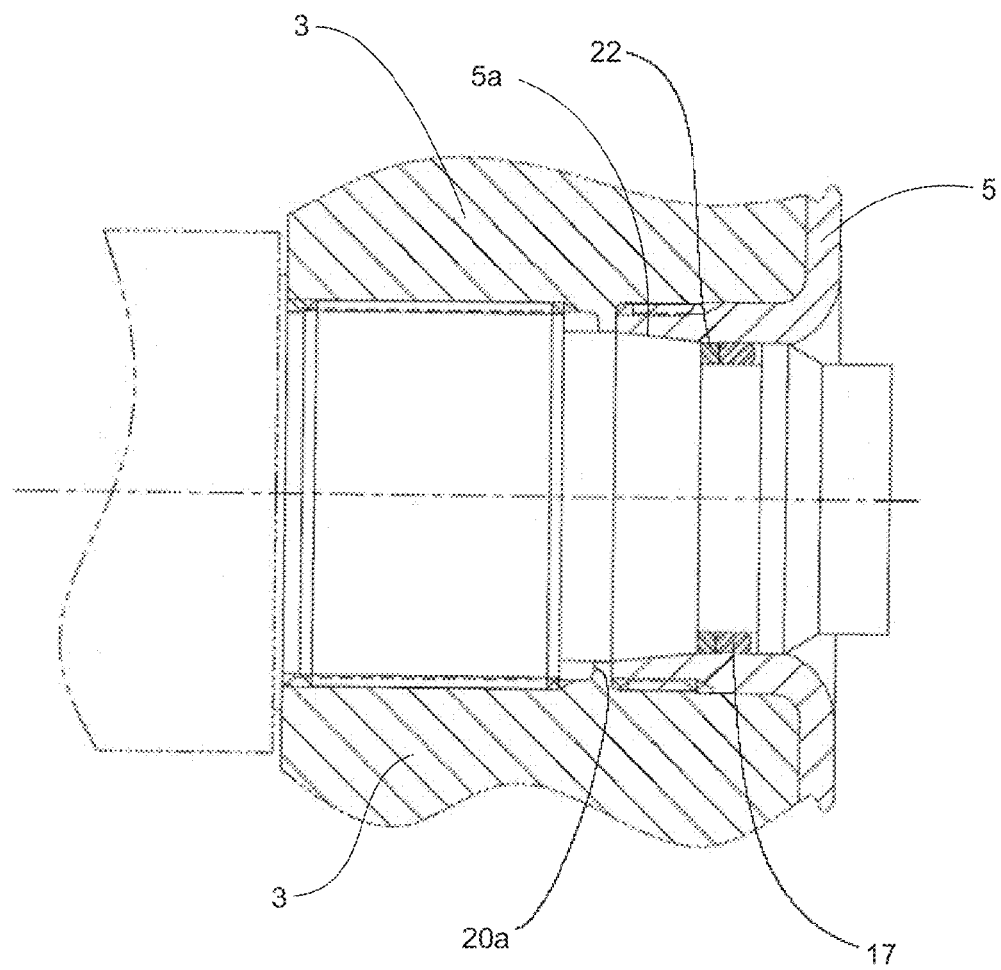
FIG. 16 is a partial cross-sectional view of the profiled surface and profiled bore according to FIG. 13.
Figure 17B:
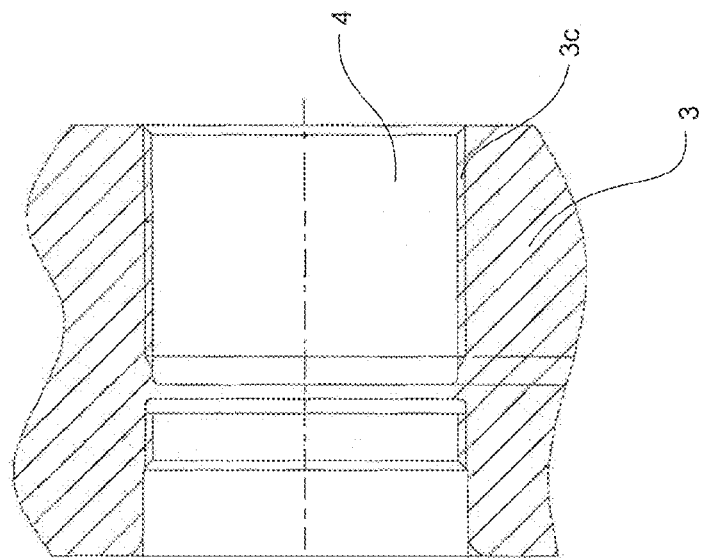
FIG. 17A and 17B are cross-sectional exploded views of the threaded assembly of the liner outlet (FIG. 17A) to the boss (FIG. 17B).
Figure 17A:
Figure 17A:
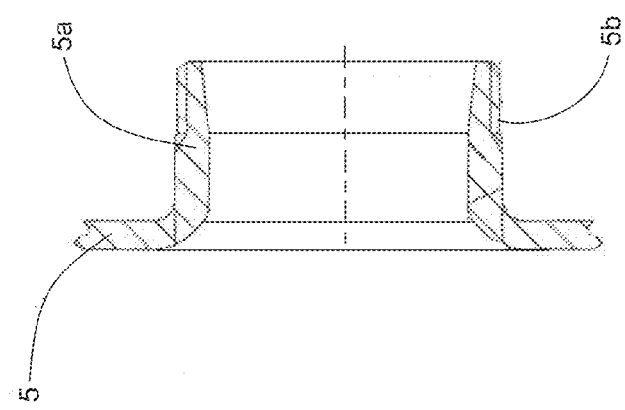

With reference to FIG. 15, in the case of an O-ring seal, and over time, high pressure gas such as hydrogen permeates through the O-ring and fills any minor downstream O-ring voidage between the annular seal groove or recess 17a, the O-ring 17 and the cylindrical sealing surface 12. During rapid decompression of the cylinder 2, trapped, high pressure gas in the annular recess 17a will be restricted from escaping. If the rate of decompression is sufficiently high, then the trapped gas can push the O-ring 17 back into the cylinder 2, extruding along the parallel, cylindrical surfaces of the liner 5 and insert 9.

A solution is to provide a small decompression leak path from the O-ring voidage, to bypass the tapered interface, and into the insert-securing portion 15 or threaded section between the boss 3 and the insert 9, which itself is a poor seal.

Accordingly, a conical sleeve 28 is provided as part of the insert 9 and is formed of a compatible insert material, such as metal. The decompression leak path formed between the conical sleeve 28 and the insert 9 extends between the annular seal element 17 and the bore-securing portion 21. The conical sleeve 28 is fit to the insert 9 between the annular seal element 17 and the bore-securing portion 21. The conical sleeve 28 has a tapered outside surface 28a, a cylindrical inside bore 28b and an upstream end 28c. The tapered outside surface 28a forms the insert's tapered compression surface 19 and performs the same compression objectives as described in the previous embodiment when the conical sleeve 28 is fit to the insert. The upstream end 28c forms the upstream or high pressure wall 17h of the annular recess 17a housing the annular seal element 17 when the conical sleeve 28 is fit to the insert 9. The cylindrical inside bore 28b which fits to a cylindrical outside surface of the insert 9 forms a metal-to-metal interface. The metal-to-metal interface forms a decompression leak path between the conical sleeve 28 and the insert 9. The leak path extends from the O-ring voidage, past the retaining shoulder 20 and threaded portion between the insert 9 and the boss 3. The O-ring voidage is downstream of the annular seal element 17. Little of the cylinder's contents should pass the O-ring seal 17. Accordingly, while the metal-to-metal interface is restrictive, there is a sufficient leak path to avoid a high pressure build up and associated energy capable to extruding the O-ring 17 on quick or rapid decompression of the cylinder 2.

Differential thermal expansion of the differing materials at the outlet can be minimized. Differential thermal expansion can occur as the plastic material of the liner outlet 5a has a higher co-efficient of thermal expansion (CTE) than that the material of -the boss 3. In both embodiments of the sealing system, radial expansion of the liner outlet 5a due to temperature changes can be minimised by reducing the thickness of liner material in the liner outlet 5a. In both embodiments of the sealing system, should a leak develop over time due to deterioration of the O-ring or the sealing surface on the liner outlet 5a or the sealing surface on the insert 9, the liner outlet or insert sealing surfaces can be serviced or repaired. This is possible as the liner outlet 5a extends into the bore 4 of the boss 3 and can be easily accessed for repair or service. As the O-ring is located on the insert 9 and since the insert 9 can be disengaged from the boss, the O-ring can also be easily replaced.

Accordingly, a method for servicing the sealing system of FIGS. 1A to 11B and FIGS. 12 to 17 is provided. The method comprises disengaging the insert 9 engaged with the liner outlet 5a from the bore 4 of the boss 3 for exposing the profiled bore 4a. The annular seal element 17 is replaced, if the same requires replacement. The annular seal element normally sealably engages with the profiled bore 4a. The sealing surfaces located on the liner outlet 5a namely the tapered bore portion 13 and/or the cylindrical sealing bore portion 12 are refurbished. The sealing surfaces located on the insert 9, namely the tapered compression surface 19 and the cylindrical plug portion 18, while robust, could also be refurbished. The bore-securing portion 21, the insert securing portion 15, the annular distal end 14 and the retaining shoulder 20, 20a can also be refurbished as necessary during the servicing operation.

The embodiments of the invention for which an exclusive property or privilege is claimed are defined as follows:

1. A compressed gas cylinder comprising:
   a pressure vessel having an vessel interior for containing high pressure gas therein and a metal boss at a vessel outlet;
   a plastic liner fit to the vessel interior and a plastic liner outlet extending from the vessel interior and into a bore of the metal boss for forming the vessel outlet, the plastic liner outlet having a cylindrical bore and a tapered bore;
   a metal insert engageable with the metal boss and interfacing with the plastic liner outlet, the metal insert having a cylindrical plug, an annular seal groove located along the cylindrical plug and having an annular seal element therein, and a tapered compression surface, the cylindrical plug being substantially immediately adjacent a high pressure wall of the annular seal groove and the tapered compression surface being substantially immediately adjacent a downstream wall of the annular seal groove wherein, when engaged, the metal insert forms an anti-extrusion interface with the plastic liner outlet, the cylindrical plug and the annular element entering the cylindrical bore to form an assembly clearance therebetween and the tapered compression surface compresses the tapered bore at an annular tapered interface between the tapered bore and the tapered compression surface to close the annular assembly clearance at the downstream wall of the annular seal groove.

2. The compressed gas cylinder of claim 1, wherein the metal insert is engageable with the metal boss by a thread interface.

3. The compressed gas cylinder of claim 1, wherein the annular tapered interface is a truncated frustum of a right circular cone.

4. The compressed gas cylinder of claim 1, wherein the plastic liner is a monolayer or a multi-layer structure.

5. The compressed gas cylinder of claim 1, wherein liner outlet is coupled to the bore of the boss by a threaded interface.

6. The compressed gas cylinder of claim 1, wherein the liner outlet is coupled to the bore of the boss by a metal-bonding adhesive material.

7. The compressed gas cylinder of claim 1, wherein the comrpressed gas cylinder stores compressed gas at pressures of about 700 bar.

8. The compressed gas cylinder of claim 7, wherein the compressed gas is hydrogen, helium or methane.

9. The compressed gas cylinder of claim 1, wherein the insert is a flow through type or plug type insert.

10. The compressed gas cylinder of claim 1 wherein the insert further comprises a conical sleeve fit to the insert and forming at least the tapered compression surface, the sleeve forming a decompression leak path between the sleeve and the insert.

11. The compressed gas cylinder of claim 10 wherein the conical sleeve has a tapered outside surface forming the tapered compression surface, a cylindrical inside bore fit to the cylindrical plug, and has an upstream end, the upstream end forming the high pressure wall of the annular seal groove.

12. The compressed gas cylinder of claim 11, wherein both of the conical sleeve and the insert are formed of metal.

13. The compressed gas cylinder of claim 1 further comprising a stop extending radially into the boss's bore, an annular distal end of the liner outlet engaging the stop for restraining axial movement of the annular distal end.

14. An anti-extrusion structure forming a seal at an outlet of a compressed gas cylinder containing high pressure gas, the cylinder having a plastic liner, the structure comprising:

a plastic liner outlet of the plastic liner extending into a bore of a metal boss at an outlet of a pressure vessel for containing high pressure gas therein, the plastic liner outlet having a cylindrical bore and a tapered bore;

a metal insert engageable with the metal boss and interfacing with the plastic liner outlet, the metal insert having a cylindrical plug, an annular seal groove located along the cylindrical plug having an annular seal element therein and a tapered compression surface, the cylindrical plug being substantially immediately adjacent a high pressure wall of the annular seal groove, and the tapered compression surface being substantially immediately adjacent a downstream wall of the annular seal groove, wherein, when engaged, the metal insert forms an anti-extrusion seal with the plastic liner, the cylindrical plug and the annular element entering the cylindrical bore to form an assembly clearance therebetween and the tapered compression surface compressing the tapered bore at an annular tapered interface to close the annular assembly clearance at the downstream wall of the annular seal groove.

* * * * *